US010978039B2

(12) United States Patent
Seffernick et al.

(10) Patent No.: US 10,978,039 B2
(45) Date of Patent: Apr. 13, 2021

(54) IN-SEAT SOUND SUPPRESSION

(71) Applicant: Oshkosh Corporation, Oshkosh, WI (US)

(72) Inventors: Daniel R. Seffernick, Oshkosh, WI (US); Peter D. Vande Hey, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 0 days.

(21) Appl. No.: 16/411,876

(22) Filed: May 14, 2019

(65) Prior Publication Data

US 2019/0355339 A1 Nov. 21, 2019

Related U.S. Application Data

(60) Provisional application No. 62/673,499, filed on May 18, 2018.

(51) Int. Cl.
*G10K 11/178* (2006.01)
*B60N 2/879* (2018.01)
*B60N 2/803* (2018.01)

(52) U.S. Cl.
CPC ............ *G10K 11/178* (2013.01); *B60N 2/803* (2018.02); *B60N 2/879* (2018.02); *G10K 2210/1282* (2013.01); *G10K 2210/3221* (2013.01)

(58) Field of Classification Search
CPC ..... G10K 2210/128; G10K 2210/1281; G10K 2210/1282; G10K 2210/12821; G10K 11/1786
USPC .................................. 381/71.1, 71.4, 71.11
See application file for complete search history.

(56) References Cited

U.S. PATENT DOCUMENTS

| 8,509,452 B2 * | 8/2013 | Yokota ................... H04R 3/007 |
| | | 381/71.4 |
| 9,045,014 B1 | 6/2015 | Verhoff et al. |
| 9,293,135 B2 * | 3/2016 | Rill ......................... G10L 15/20 |
| 9,330,653 B2 | 5/2016 | Yokota |
| 9,454,952 B2 * | 9/2016 | Tzirkel-Hancock ......................... |
| | | G10K 11/17881 |
| 9,595,251 B2 | 3/2017 | Whinnery |
| 9,656,640 B1 | 5/2017 | Verhoff et al. |

(Continued)

FOREIGN PATENT DOCUMENTS

JP H08-328570 12/1996

OTHER PUBLICATIONS

International Search Report and Written Opinion regarding PCT PCT/US2019/032209, dated Aug. 27, 2019, 16 pps.

*Primary Examiner* — Disler Paul
(74) *Attorney, Agent, or Firm* — Foley & Lardner LLP

(57) ABSTRACT

A vehicle includes a passenger capsule, a seat, and a sound suppression system. The passenger capsule includes a headliner. The seat is positioned within the passenger capsule. The seat includes a headrest. The sound suppression system includes one or more speakers and a controller. The one or more speakers are at least one of (i) positioned within the headrest or (ii) positioned within the headliner. The controller is configured to control the one or more speakers to emit sound waves having at least one of a target frequency or a target amplitude to generate a noise suppression zone that projects outward from at least one of the headrest or the headliner toward a passenger sitting in the seat to suppress one or more low frequency sound waves perceived by the passenger.

19 Claims, 9 Drawing Sheets

(56) References Cited

U.S. PATENT DOCUMENTS

| | | | |
|---|---|---|---|
| 10,111,000 B1* | 10/2018 | Ho | H04R 1/028 |
| 10,152,962 B2* | 12/2018 | MacNeille | G10K 11/17857 |
| 10,199,030 B2* | 2/2019 | Torres | G10K 11/17817 |
| 10,403,258 B2* | 9/2019 | Zafeiropoulos | G10K 11/1781 |
| 10,419,868 B2* | 9/2019 | Hotary | G06K 9/00832 |
| 2014/0233748 A1* | 8/2014 | Klug | G10K 11/178 |
| | | | 381/71.4 |
| 2015/0189433 A1 | 7/2015 | Ganeshkumar | |
| 2015/0249886 A1* | 9/2015 | Haylett | G10K 11/178 |
| | | | 381/71.4 |
| 2016/0029111 A1* | 1/2016 | Wacquant | H04R 3/005 |
| | | | 381/71.4 |
| 2016/0100250 A1* | 4/2016 | Baskin | B60N 2/879 |
| | | | 297/217.4 |
| 2016/0163303 A1* | 6/2016 | Benattar | G10K 11/17885 |
| | | | 381/71.11 |
| 2017/0110107 A1* | 4/2017 | Iida | G10K 11/178 |
| 2017/0253221 A1 | 9/2017 | Verhoff et al. | |

\* cited by examiner

US 10,978,039 B2

IN-SEAT SOUND SUPPRESSION

CROSS-REFERENCE TO RELATED PATENT APPLICATION

This application claims the benefit of U.S. Provisional Patent Application No. 62/673,499, filed May 18, 2018, which is incorporated herein by reference in its entirety.

BACKGROUND

The interior of a vehicle may have various unwanted noises at various frequencies (e.g., engine noise, road noise, suspension noise, wind noise, etc.) that can hinder the hearing of passengers within the vehicle.

SUMMARY

One embodiment relates to a vehicle. The vehicle includes a passenger capsule, a seat, and a sound suppression system. The passenger capsule includes a headliner. The seat is positioned within the passenger capsule. The seat includes a headrest. The sound suppression system includes one or more speakers and a controller. The one or more speakers are at least one of (i) positioned within the headrest or (ii) positioned within the headliner. The controller is configured to control the one or more speakers to emit sound waves having at least one of a target frequency or a target amplitude to generate a noise suppression zone that projects outward from at least one of the headrest or the headliner toward a passenger sitting in the seat to suppress one or more low frequency sound waves perceived by the passenger.

Another embodiment relates to a sound suppression system for a vehicle. The sound suppression system includes one or more speakers, a microphone, and a controller. The one or more speakers are configured to be positioned within a cabin of the vehicle. The microphone is configured to be positioned within the cabin and acquire sound data regarding one or more sounds waves perceived by a passenger of the vehicle. The controller is configured to receive the sound data from the microphone and control the one or more speakers to emit noise-canceling sound waves having at least one of a target frequency or a target amplitude to generate a noise suppression zone that projects toward the passenger of the vehicle to suppress at least one of the one or more sound waves perceived by the passenger.

Still another embodiment relates to a vehicle. The vehicle includes a passenger cabin and a sound suppression system. The sound suppression system includes one or more speakers positioned within the passenger cabin, a microphone positioned within the passenger cabin and configured to acquire sound data regarding one or more sounds waves perceived by a passenger of the vehicle, and a controller. The controller is configured to receive the sound data from the microphone and control the one or more speakers to emit noise-canceling sound waves to generate a noise suppression zone that projects toward the passenger of the vehicle to suppress at least one of the one or more sound waves perceived by the passenger.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

According to an exemplary embodiment, a sound suppression system for a vehicle is configured to generate zones of quiet or sound suppression zones around the heads of passengers sitting within the vehicle without the use of devices worn by the passengers. By way of example, a vehicle may generate noises that reach rather loud levels within the cabin of the vehicle. Ear plugs or other noise canceling devices may be worn by the passengers, however, such devices hinder hearing and communicating capabilities. Accordingly, the sound suppression system of the present disclosure is configured to target various frequencies (e.g., low-frequency noises, pre-identified frequencies, etc.) to suppress noises at the target frequencies without hindering the hearing of the passengers, thereby reducing the sound levels perceived by the passengers while within the generated zones of quiet or sound suppression zones.

Figure 1:
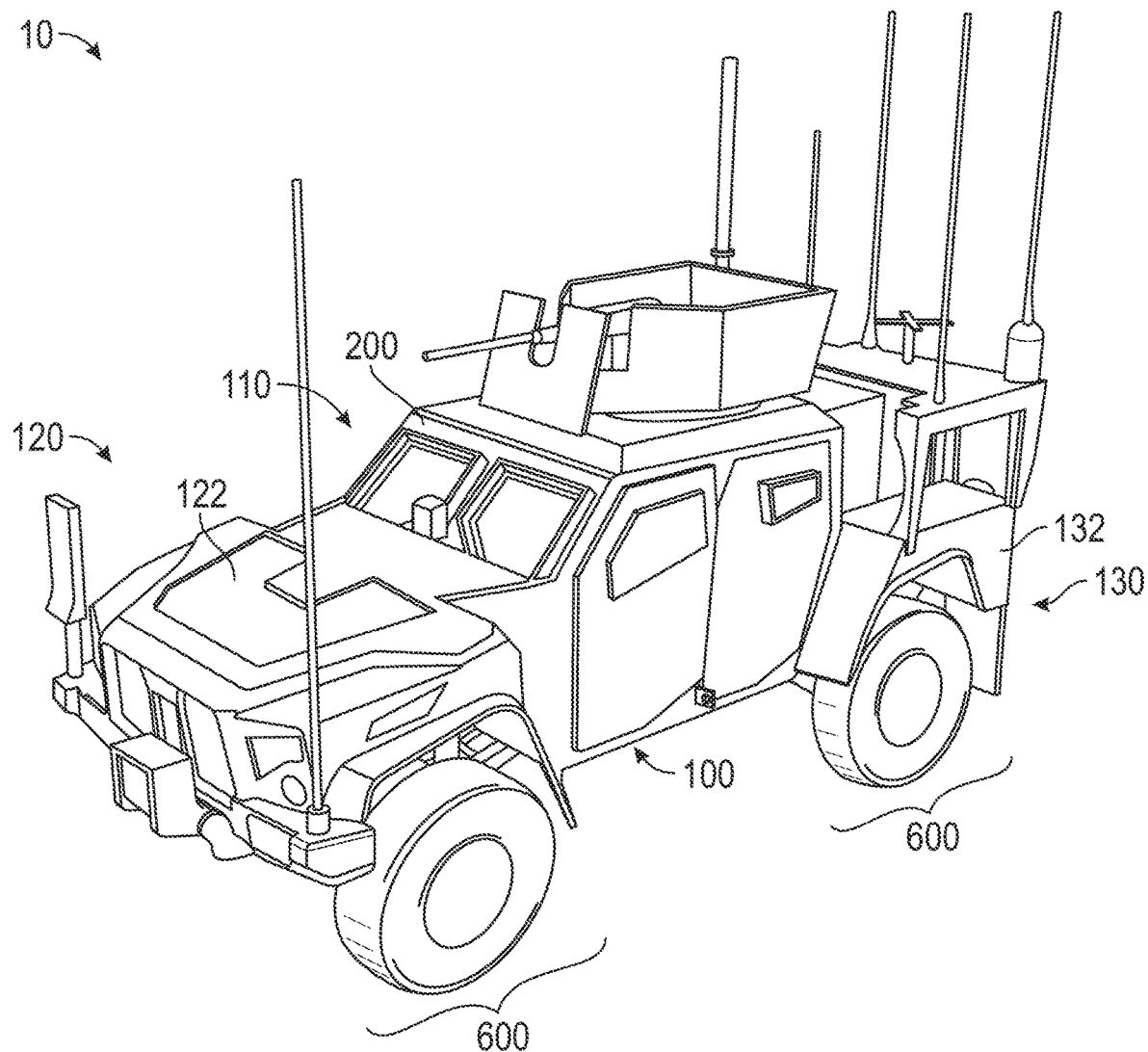
FIG. 1 is a perspective view of a vehicle, according to an exemplary embodiment.
Figure 2:
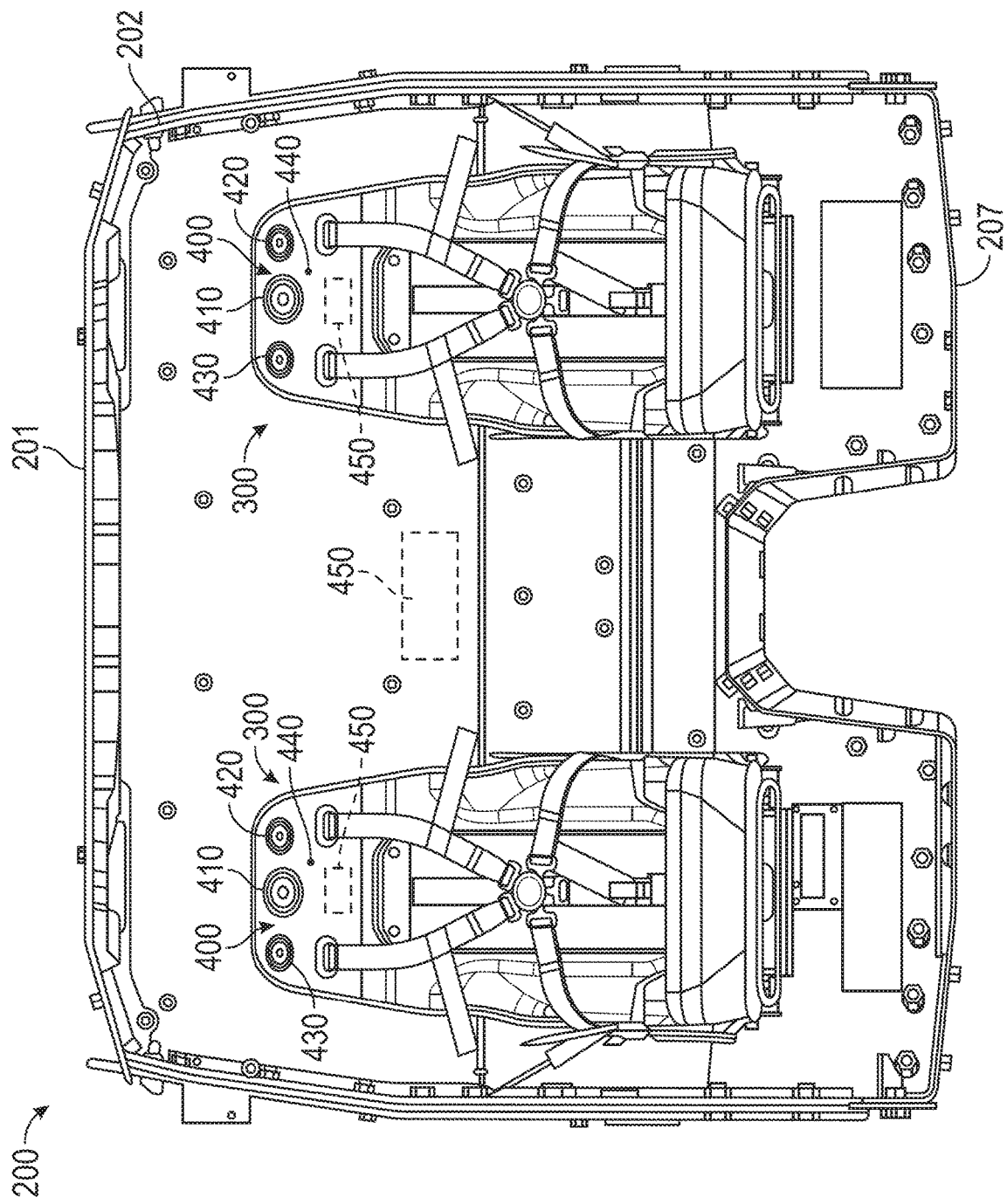
FIG. 2 is a schematic sectional view of a passenger capsule of the vehicle of FIG. 1 having a sound suppression system, according to an exemplary embodiment.

As shown in FIG. 1, a vehicle, shown as vehicle 10, includes a hull and frame assembly 100, an armor assembly 200, and wheel and tire assemblies 600. According to the exemplary embodiment shown in FIG. 1, the vehicle 10 is a military vehicle (e.g., joint light tactical vehicle ("JLTV"), family of medium tactical vehicles ("FMTV"), etc.). In other embodiments, the vehicle 10 is an aircraft (e.g., an airplane, a helicopter, etc.), a troop carrier, a tank, a passenger vehicle, a semi-truck, an off-road vehicle, an all-terrain vehicle, a utility task vehicle, a motorcycle, construction equipment (e.g., a skid loader, a telehandler, boom lift, a scissor lift, etc.), a refuse vehicle, a concrete mixer truck, an ambulance, a fire truck, and/or still another type of vehicle. According to an exemplary embodiment, the vehicle 10 includes an engine, a transmission, a transaxle, a braking system, a fuel system, and a suspension system coupling the hull and frame assembly 100 to the wheel and tire assemblies 600.

As shown in FIG. 1, the hull and frame assembly 100 includes a passenger capsule, shown as cabin 110, a front module, shown as front module 120, and a rear module, shown as rear module 130. According to an exemplary embodiment, the front module 120 and the rear module 130 are coupled to the cabin 110 with a plurality of interfaces. As shown in FIG. 1, the front module 120 includes a front axle having wheel and tire assemblies 600. The front module 120 includes a body panel, shown as hood 122. In some embodiments, the hood 122 at least partially surrounds the engine of the vehicle 10. As shown in FIG. 1, the rear module 130 includes a body assembly, shown as bed 132.

As shown in FIGS. 2 and 6-8, the armor assembly 200 includes a passenger capsule assembly 202. The passenger capsule assembly 202 includes a roof 201, a floor 207, a headliner 210, and seats 300. As shown in FIGS. 1,2, and 6-8, the passenger capsule assembly 202 is a main passenger compartment of the vehicle 10. The passenger capsule assembly 202 may be configured to encapsulate and/or provide a space for one or more seats 300 for the operator (e.g., driver, etc.) and one or more occupants of the vehicle 10 (e.g., front seats, rear seats, etc.). In an alternative embodiment, the passenger capsule assembly 202 is a troop carrier disposed on and/or within another portion of a vehicle (e.g., the bed 132 of the vehicle 10, etc.).

Figure 4:
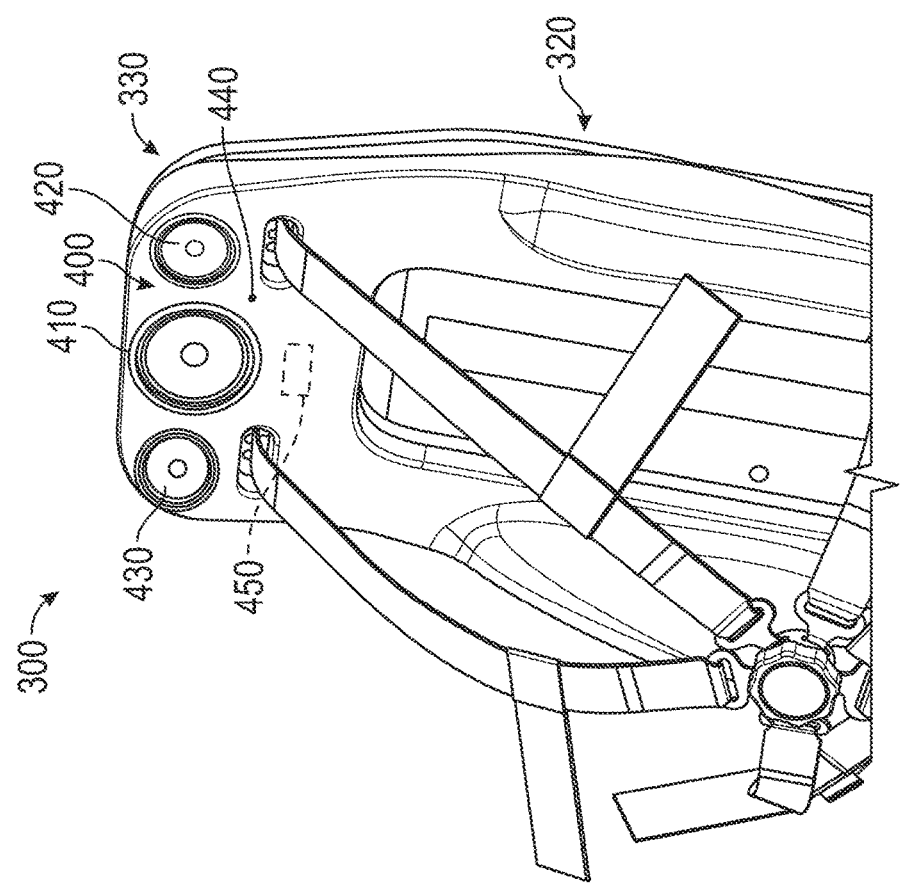
FIGS. 3 and 4 are various views of a seat associated with the passenger capsule of FIG. 2, according to an exemplary embodiment.
Figure 3:
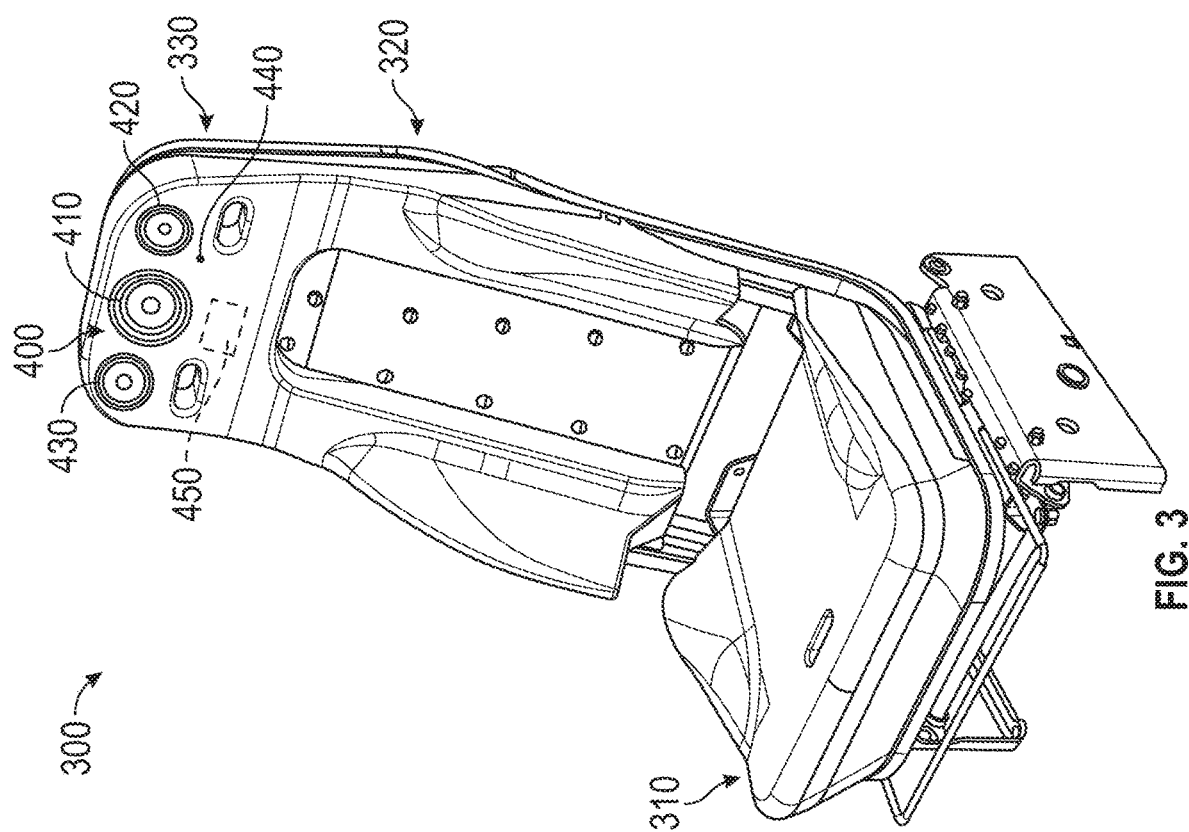
Figure 5:
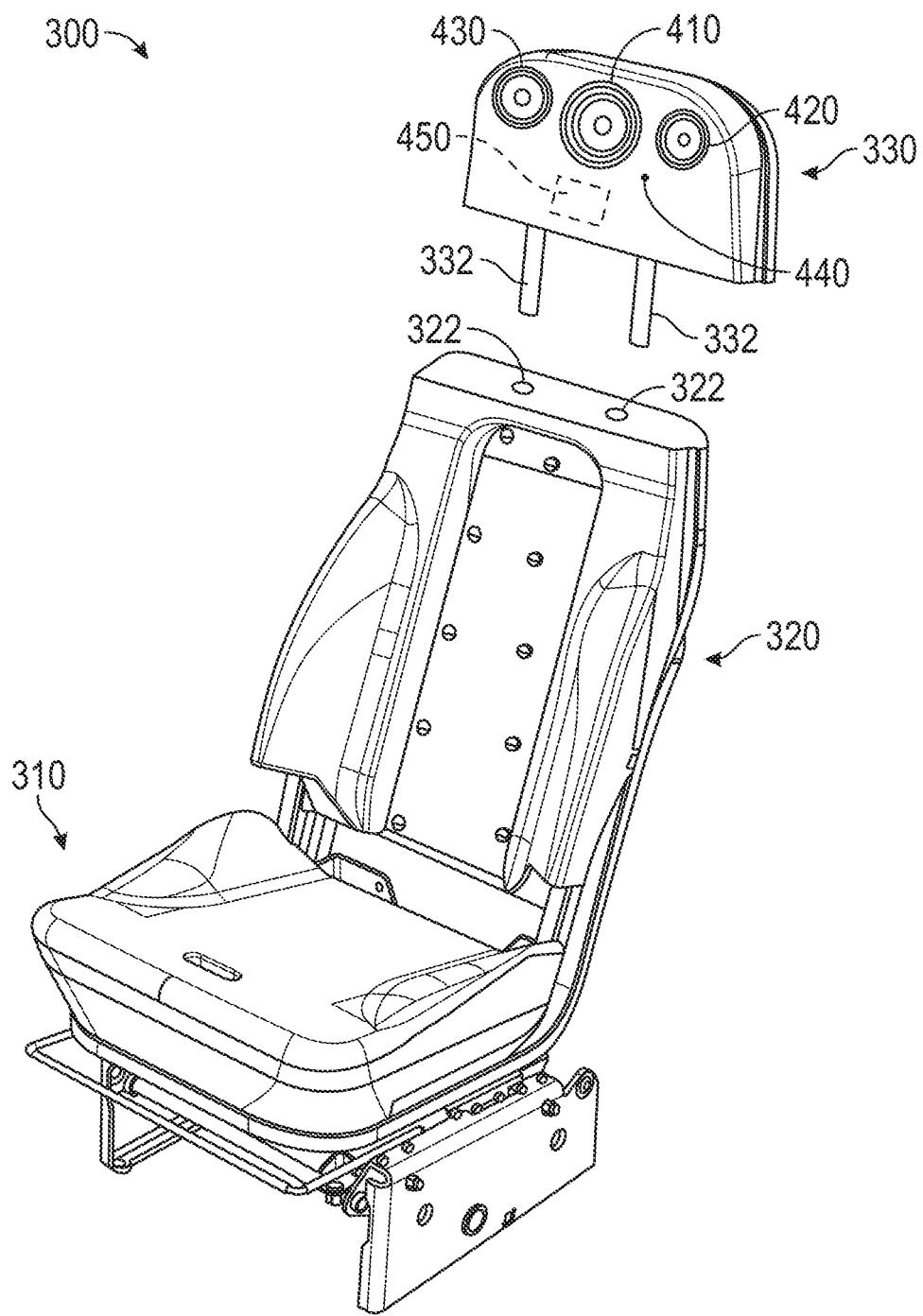
FIG. 5 is a perspective view of a seat associated with the passenger capsule of FIG. 2 having a removable headrest, according to an exemplary embodiment.

As shown in FIGS. 3-6, each of the seats 300 include a first portion, shown as seat portion 310, a second portion, shown as back portion 320, and a third portion, shown as headrest 330. As shown in FIGS. 3 and 4, the headrest 330 is integrally formed with the back portion 320. As shown in FIG. 5, the headrest 330 is releasably coupled to the back portion 320 where the back portion 320 of the seat 300 defines interfaces, shown as slots 322, that cooperate with (e.g., receives, etc.) corresponding interfaces of the headrest 330, shown as posts 332.

Figure 6:
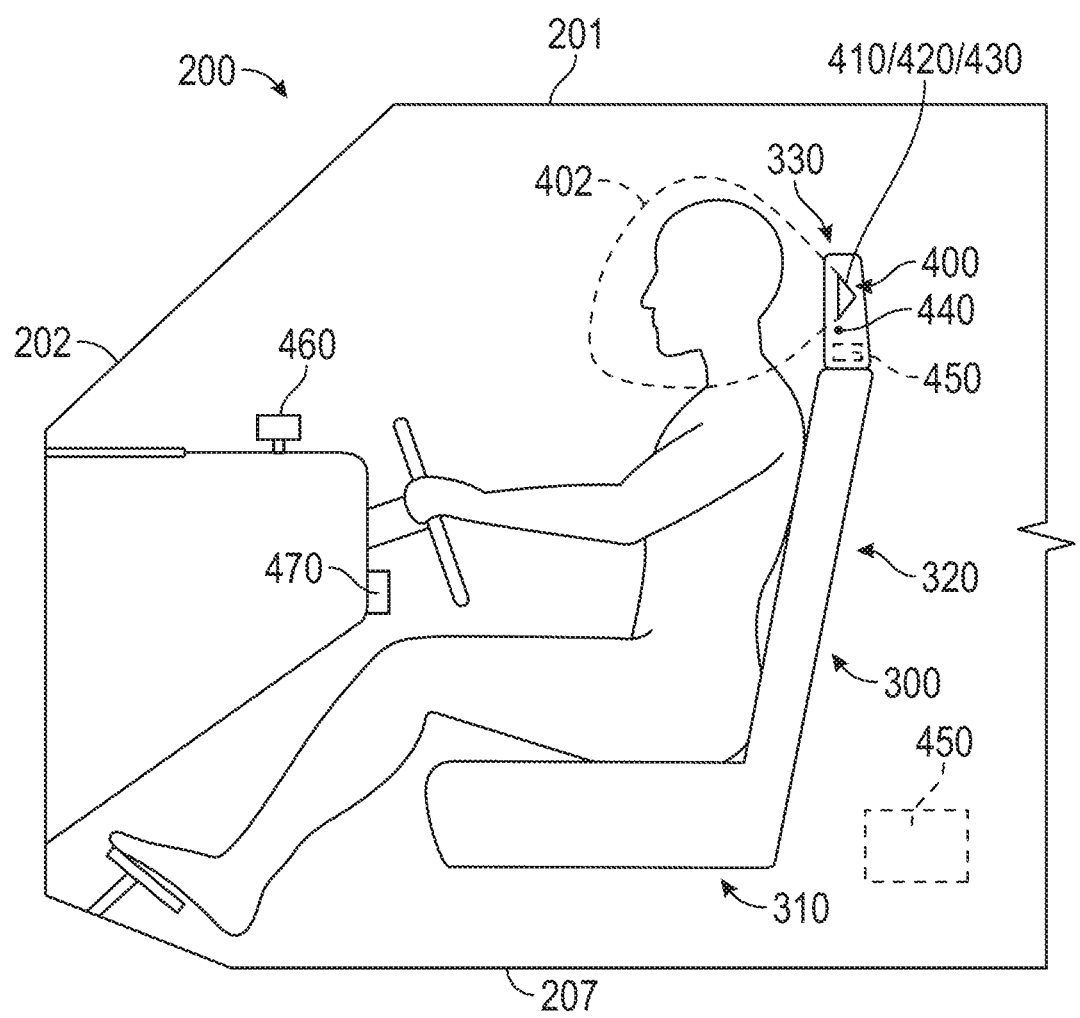
FIG. 6 is a schematic side view of the passenger capsule of the vehicle of FIG. 2, according to an exemplary embodiment.
Figure 7:
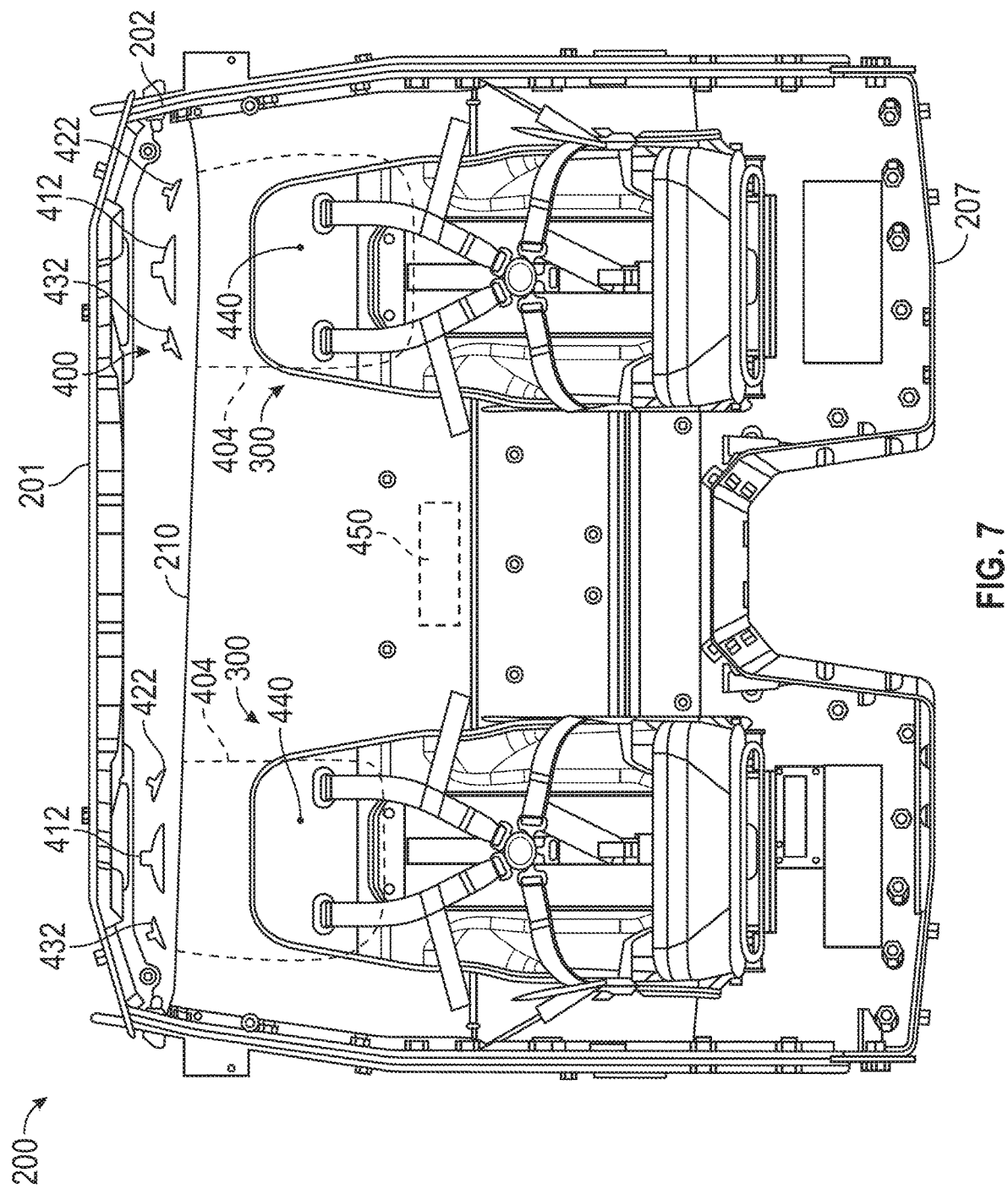
FIG. 7 is a schematic sectional view of a passenger capsule of the vehicle of FIG. 1 having a sound suppression system, according to another exemplary embodiment.
Figure 8:
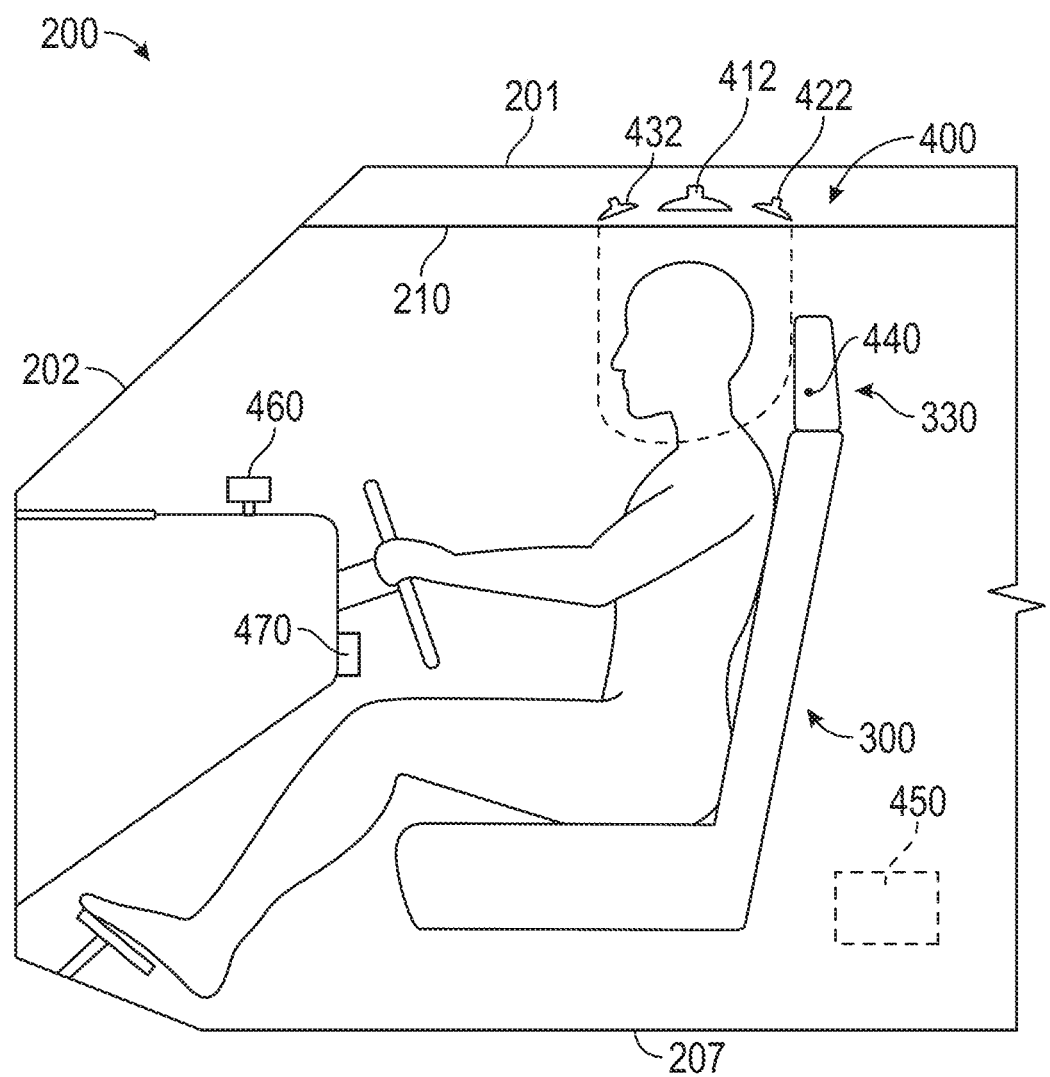
FIG. 8 is a schematic side view of the passenger capsule of the vehicle of FIG. 7, according to an exemplary embodiment.

According to the exemplary embodiment shown in FIGS. 2-8, the passenger capsule assembly 202 includes a noise suppression or noise canceling system, shown as sound suppression system 400, configured to provide sound suppression to occupants sitting in the seats 300. As shown in FIGS. 2-6, the sound suppression system 400 is configured as an in-seat sound suppression system (e.g., multiple components of the sound suppression system 400 are positioned within the seats 300, etc.). As shown in FIGS. 7 and 8, the sound suppression system 400 is configured as a sound suppression system positioned external from the seats 300 (e.g., the majority of the components of the sound suppression system 400 are positioned external from the seats 300, etc.). In some embodiments, the sound suppression system 400 includes components of both the in-seat sound suppression system and the external sound suppression system that cooperatively provide the sound suppression to the occupants sitting in the seats 300.

As shown in FIGS. 2-6, the sound suppression system 400 includes a first speaker, shown as first in-seat speaker 410, a second speaker, shown as second in-seat speaker 420, and a third speaker, shown as third in-seat speaker 430, positioned within each headrest 330 of the seats 300. The first in-seat speakers 410 are positioned along a vertical centerline of and disposed within (e.g., recessed within, etc.) each of the headrests 330 such that the first in-seat speakers 410 are positioned directly behind or approximately directly behind the head of passengers sitting in the seats 300. The second in-seat speakers 420 are positioned laterally offset from (e.g., to the left of, etc.) the vertical centerline of and disposed within (e.g., recessed within, etc.) each of the headrests 330 such that the second in-seat speakers 420 are proximate the left ear of passengers sitting in the seats 300. The third in-seat speakers 430 are positioned laterally offset from (e.g., to the right of, etc.) the vertical centerline of and disposed within (e.g., recessed within, etc.) the headrests 330 such that the third in-seat speakers 430 are proximate the right ear of passengers sitting in the seat 300. In other embodiments, the sound suppression system 400 includes a different number of speakers and/or the speakers are otherwise positioned within the seat 300. According to an exemplary embodiment, the first in-seat speaker 410 is configured to emit sound therefrom at a lower frequency than that of the sound emitted from the second in-seat speaker 420 and/or the third in-seat speaker 430. In some embodiments, the speakers are covered with some sort of protective covering, cage, grille, and/or padding.

As shown in FIGS. 7 and 8, the sound suppression system 400 additionally or alternatively includes a fourth speaker, shown as first headliner speaker 412, a fifth speaker, shown as second headliner speaker 422, and a sixth speaker, shown third headliner speaker 432, positioned within the headliner 210 above each of the seats 300. The first headliner speakers 412 are positioned directly above each of the seats 300. The second headliner speakers 422 are positioned laterally offset from (e.g., to the left of, to the rear of, etc.) the first headliner speakers 412. The third headliner speakers 432 are positioned laterally offset from (e.g., to the right of, to the front of, etc.) the first headliner speakers 412. In other embodiments, the sound suppression system 400 includes a different number of speakers and/or the speakers are otherwise positioned within the headliner 210. According to an exemplary embodiment, the first headliner speaker 412 is configured to emit sound therefrom at a lower frequency than that of the sound emitted from the second headliner speaker 422 and/or the third headliner speaker 432.

As shown in FIG. 6, the first in-seat speakers 410, the second in-seat speakers 420, and the third in-seat speakers 430 are selectively and/or dynamically controllable to emit sound waves at target frequencies that are out of phase with noise within the passenger capsule assembly 202 (e.g., low frequency noises, etc.) to dampen the noise and generate first zones of quiet (e.g., a quiet bubble, etc.), shown as first sound suppression zones 402, around the head of the passengers within each of the seats 300. Accordingly, when a passenger's head is within the first sound suppression zone 402, the noise (e.g., from lower frequency sources, etc.) heard thereby is significantly lower than what would otherwise be heard outside of the first sound suppression zone 402.

As shown in FIGS. 7 and 8, the first headliner speakers 412, the second headliner speakers 422, and the third headliner speakers 432 are selectively and/or dynamically controllable to emit sound waves at target frequencies that are out of phase with noise within the passenger capsule assembly 202 (e.g., low frequency noises, etc.) to dampen the noise and generate second zones of quiet (e.g., a quiet bubble, etc.), shown as second sound suppression zones 404, around the head of the passengers within each of the seats 300. Accordingly, when a passenger's head is within the second sound suppression zone 404, the noise (e.g., from lower frequency sources, etc.) heard thereby is significantly lower than what would otherwise be heard outside of the second sound suppression zone 404. In some embodiments, the first sound suppression zone 402 and the second sound suppression zone 404 are used in unison to further dampen sound and/or depend different frequency noises.

According to an exemplary embodiment, the first sound suppression zones 402 and/or the second sound suppression zones 404 are configured to suppress noises having a frequency of 1,000 Hertz ("Hz") or less. In some embodiments, the first sound suppression zones 402 and/or the second sound suppression zones 404 are configured to suppress noises having a frequency greater than 1,000 Hz (e.g., 1,200 Hz; 1,500 Hz; 2,000 Hz; etc.). By targeting lower frequency noises, the out of phase sound waves that make up the first sound suppression zones 402 and/or the second sound suppression zones 404 may travel farther from the speakers than if higher frequency noises were targeted (i.e., lower frequency waves travel farther than higher frequency waves). According to an exemplary embodiment, the first sound suppression zones 402 and/or the second sound suppression zones 404 are capable of extending up to approximately sixteen inches from the speakers that they were emitted by. In some embodiments, the first sound suppression zones 402 and/or the second sound suppression zones 404 extend farther than or less than sixteen inches (e.g., up to at least 22 inches, up to at least 20 inches, up to at least 18 inches, up to at least 14 inches, up to at least 12 inches, up to at least 10 inches, up to at least 8 inches, up to at least 6 inches, etc.) by emitting sound waves that target lower frequencies, by emitting sound waves that target higher frequencies, etc.

As shown in FIGS. 2-8, the sound suppression system 400 includes a microphone, shown as in-seat microphone 440, positioned within each headrest 330 of the seats 300. According to an exemplary embodiment, the in-seat microphone 440 is positioned within the headrest 330 at a location that is near one or more ears of a passenger sitting in the seat 300. Such positioning of the in-seat microphone facilitates monitoring sound that is approximately what a passenger sitting in the seat 300 is hearing. In other embodiments, the in-seat microphone 440 is otherwise positioned. By way of example, a microphone may be worn by the passenger (e.g., around their ear, an earpiece, etc.). Sound data acquired by the in-seat microphone 440 may be analyzed for error tracking and making dynamic adjustments to the first sound suppression zone 402 and/or the second sound suppression zone 404 as needed to improve the sound suppression of noise at target frequencies.

As shown in FIGS. 6 and 8, the sound suppression system 400 includes a user detection sensor, shown as user detection sensor 460. The user detection sensor 460 may be configured to detect the presence of, detect characteristics of, and/or facilitate identifying a passenger sitting within a respective seat 300. By way of example, the user detection sensor 460 may be a weight sensor or switch within the seat portion 310 that detects when a passenger is sitting thereon. By way of another example, the user detection sensor 460 may be a camera or other type of sensor capable of detecting characteristics of the passenger (e.g., sitting position, height, head position, etc.). By way of yet another example, the user detection sensor 460 may be a biometric sensor or scanner (e.g., a fingerprint scanner, a facial scanner, a retinal scanner, etc.) that facilitates identifying the passenger (e.g., from a set of pre-stored passenger profiles, etc.).

As shown in FIGS. 6 and 8, the sound suppression system 400 includes an input device, shown as user input/output ("I/O") device 470. The user I/O device 470 may be configured to facilitate a passenger in selecting a pre-stored passenger profile associated with them and/or setting up a new passenger profile.

As shown in FIGS. 2-8, the sound suppression system 400 includes a control system, shown as controller 450. In some embodiments, as shown in FIGS. 2-6, the sound suppression system 400 includes a plurality of the controllers 450, one positioned within each of the headrests 330. Such individually positioned controllers 450 may individually control the components of the sound suppression system 400 within the headrest 330 (e.g., the first in-seat speaker 410, the second in-seat speaker 420, the third in-seat speaker 430, the in-seat microphone 440, etc.) associated therewith. In some embodiments, the controllers 450 positioned within the seats 300 additionally or alternatively control the first headliner speaker 412, the second headliner speaker 422, and the third headliner speaker 432 associated with the seat 300 thereof. In some embodiments, as shown in FIGS. 2 and 6-8, the sound suppression system 400 additionally or alternatively includes a central controller 450. Such a central controller 450 may control all of the components of the sound suppression system 400 (e.g., control sound suppression for each of the seats 300 independently, etc.) and/or send and receive data/commands with the controllers 450 positioned within the seats 300. Accordingly, the controller(s) 450 may facilitate independent sound suppression control at each of the seats 300 (e.g., based on the sound at the headrest 330, the characteristics of the passenger in the respective seat 300, etc.).

Figure 9:
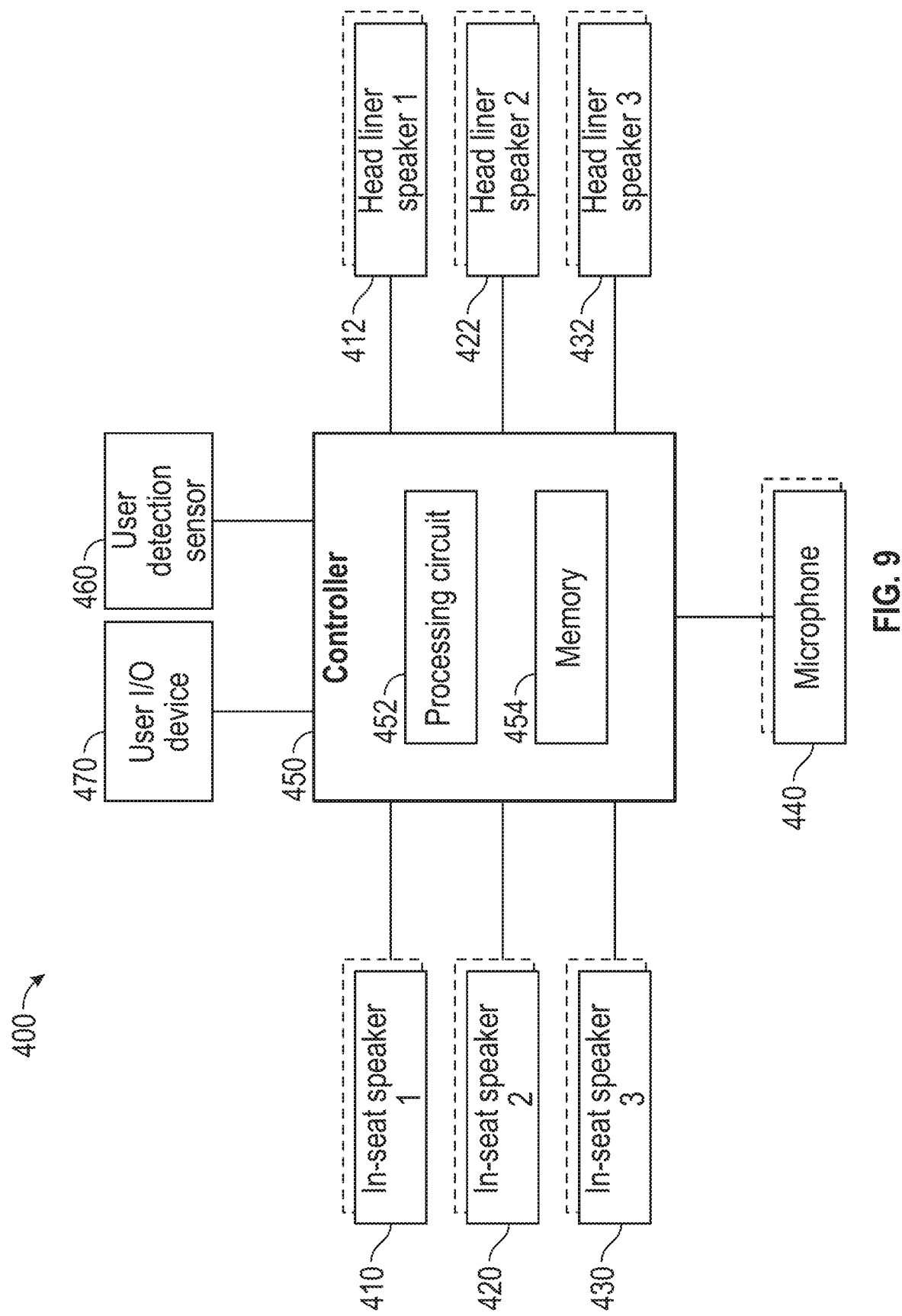
FIG. 9 is a schematic block diagram of the sound suppression system for the passenger capsule of FIGS. 2 and 7, according to an exemplary embodiment.

As shown in FIG. 9, the controller 450 is coupled to the first in-seat speaker 410, the first headliner speaker 412, the second in-seat speaker 420, the second headliner speaker 422, the third in-seat speaker 430, the third headliner speaker 432, the in-seat microphone 440, the user detection sensor 460, and the user I/O device 470. In some embodiments, the controller 450 is coupled to a plurality of the first in-seat speakers 410, a plurality of the first headliner speakers 412, a plurality of the second in-seat speakers 420, a plurality of the second headliner speakers 422, a plurality of the third in-seat speakers 430, a plurality of the third headliner speakers 432, a plurality of the in-seat microphones 440, the user detection sensor 460, and the user I/O device 470 (e.g., in embodiments where the controller 450 controls sound suppression for all of the seats 300, etc.). In other embodiments, the controller 450 is coupled to more or fewer components. By way of example, the controller 450 may send and/or receive signals with one or more of the first in-seat speakers 410, one or more of the first headliner speakers 412, one or more of the second in-seat speakers 420, one or more of the second headliner speakers 422, one or more of the third in-seat speakers 430, one or more of the third headliner speakers 432, one or more of the in-seat microphones 440, the user detection sensor 460, and/or the user I/O device 470.

The controller 450 may be implemented as a general-purpose processor, an application specific integrated circuit (ASIC), one or more field programmable gate arrays (FPGAs), a digital-signal-processor (DSP), circuits containing one or more processing components, circuitry for supporting a microprocessor, a group of processing components, or other suitable electronic processing components. According to the exemplary embodiment shown in FIG. 9, the controller 450 includes a processing circuit 452 and a memory 454. The processing circuit 452 may include an ASIC, one or more FPGAs, a DSP, circuits containing one or more processing components, circuitry for supporting a microprocessor, a group of processing components, or other suitable electronic processing components. In some embodiments, the processing circuit 452 is configured to execute computer code stored in the memory 454 to facilitate the activities described herein. The memory 454 may be any volatile or non-volatile computer-readable storage medium capable of storing data or computer code relating to the activities described herein. According to an exemplary embodiment, the memory 454 includes computer code modules (e.g., executable code, object code, source code, script code, machine code, etc.) configured for execution by the processing circuit 452. In some embodiments, controller 450 represents a collection of processing devices (e.g., servers, data centers, etc.). In such cases, the processing circuit 452 represents the collective processors of the devices, and the memory 454 represents the collective storage devices of the devices.

According to an exemplary embodiment, the controller 450 (e.g., the central controller, the individual seat controllers, etc.) is configured to control the various speakers of the sound suppression system 400 such that the speakers emit sound waves having at least one of a target frequency and a target amplitude to generate the first noise suppression zones 402 and/or the second noise suppression zones 404 that project outward from at least one of the headrests 330 and the headliner 210 toward the passengers sitting in the seats 300 of the passenger capsule assembly 202 to suppress low frequency sound waves perceived by the passengers.

In some embodiments, the controller 450 (e.g., the central controller, the individual seat controllers, etc.) is configured to store a baseline noise profile for the vehicle 10. By way of example, a noise profile may be experimentally recorded for the vehicle 10 and the various lower frequency noises (e.g., less than 1,000 Hz, etc.) generated thereby identified (e.g., the frequencies and amplitudes of the sound waves generated thereby, etc.). Using such a baseline noise profile, the controller 450 may thereby more accurately and effectively control the various speakers to generate the various first sound suppression zones 402 and/or the second sound suppression zones 404 throughout the passenger capsule assembly 202.

According to an exemplary embodiment, the controller 450 (e.g., the central controller, the individual seat controllers, etc.) is configured to receive the sound data from each of the in-seat microphones 440 and make adjustments to the frequency and/or amplitudes of the sound waves of the first sound suppression zones 402 and/or the second sound suppression zones 404 (e.g., relative to the baseline profile for the vehicle 10, etc.). By way of example, the baseline profile may not be entirely representative of the sound at each headrest 330 within the passenger capsule assembly 202. Accordingly, by monitoring the sound at each headrest 330 using the in-seat microphones 440, the controller 450 may make minor adjustments to the baseline profile to be more representative of the sound waves at each specific headrest 330 and, thereby, provide more effective sound suppression.

In some embodiments, the controller 450 (e.g., the central controller, the individual seat controllers, etc.) is configured to additionally or alternatively make adjustments to the frequency and/or amplitude of the sound waves of the first sound suppression zones 402 and/or the second sound suppression zones 404 based on the identity of each respective passenger and/or characteristics of each respective passenger. By way of example, the controller 450 may be configured to use pre-stored user profiles (e.g., based on data received from the user detection sensor 460, based on a selection made by the passenger on the user I/O device 470, etc.) to make adjustments. For example, each pre-stored user profile may indicate the height of a respective passenger, typical head positions thereof on the headrest 330, etc. The controller 450 may then make minor adjustments to the first sound suppression zones 402 and/or the second sound suppression zones 404 based on the characteristics of the specific passenger. By way of another example, the controller 450 may be configured to detect characteristics of the passengers in real-time (e.g., using the user detection sensor 460, height, head position, etc.) to make dynamic adjustments to the first sound suppression zones 402 and/or the second sound suppression zones 404 based on the detected characteristics. The sound suppression system 400 may thereby accommodate different sized passengers by adapting to their respective characteristics to provide effective sound suppression to each unique passenger.

Figure 10:
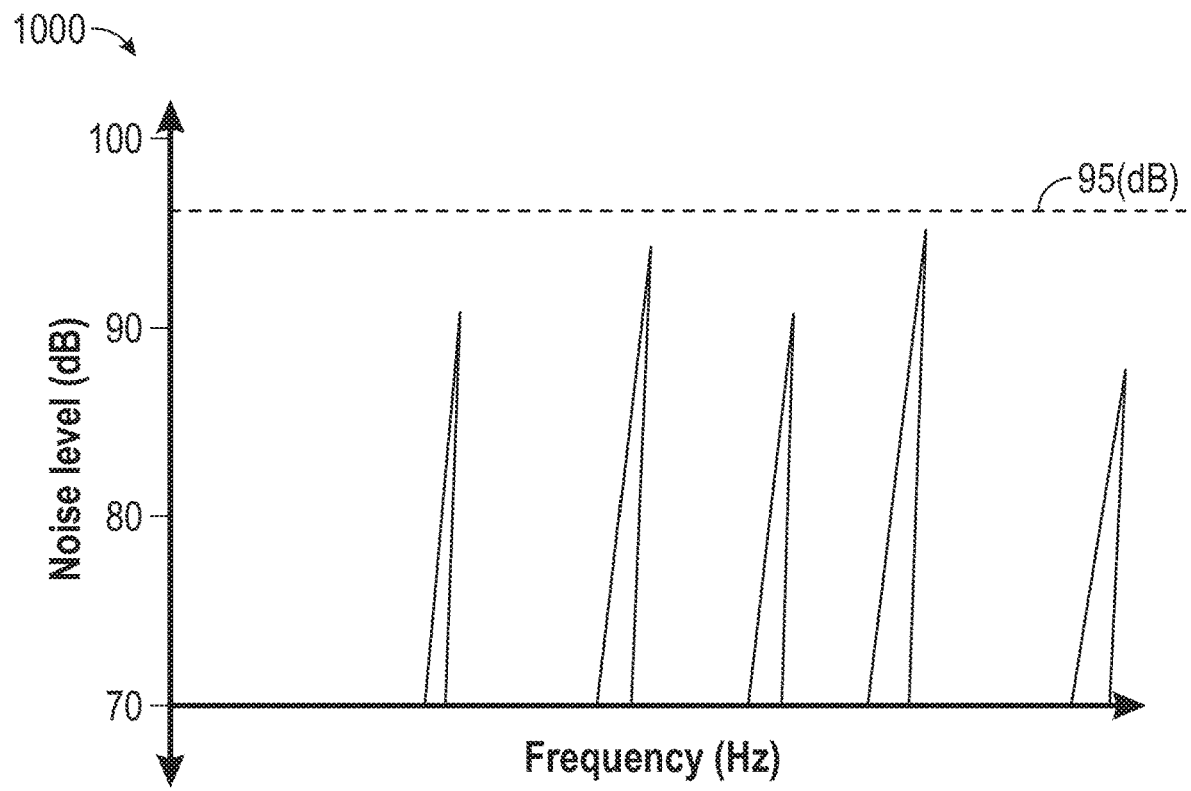
FIGS. 10 and 11 are various graphs depicting volume within the passenger capsule prior to sound suppression and after sound suppression, according to an exemplary embodiment.
Figure 11:
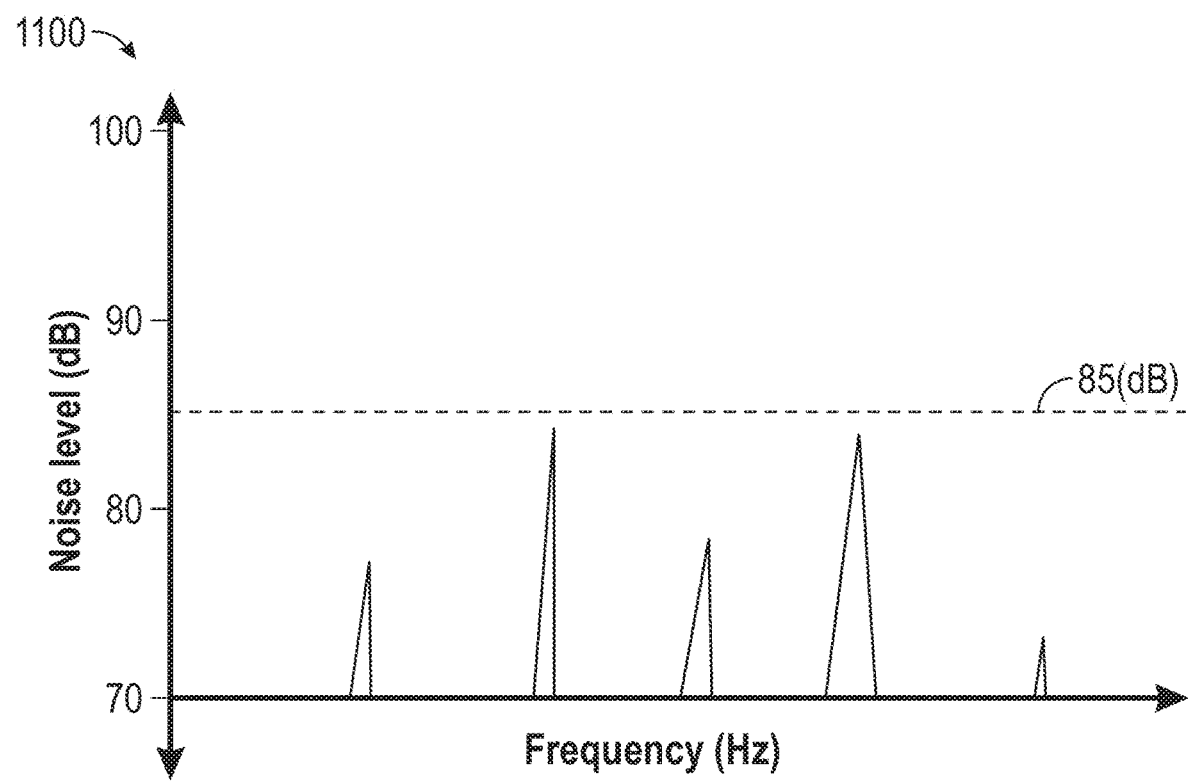

As shown in FIGS. 10 and 11, a first sound profile, shown as natural noise profile 1000, and a second sound profile, shown as suppressed noise profile 1100, depict the performance capability of the sound suppression system 400, according to one embodiment. As shown in FIG. 10, the natural noise profile 1000 of the noise generated by the vehicle 10 (e.g., low frequency noises, noises below 1,000 Hz, etc.) includes a plurality of sound peaks at varying frequencies that exceed 85 decibels ("dB"), and in some instances approach or exceed 95 dB within the passenger capsule assembly 202. Such noise levels may hinder communication between the passengers, as well as disrupt the ability of the passengers from hearing communications through earpieces (e.g., for communication with central command, a superior officer, another vehicle, another earpiece, a remote phone, etc.). As shown in FIG. 11, by generating the first sound suppression zones 402 and/or the second sound suppression zones 404 with the sound suppression system 400, all of the sound peaks (e.g., low frequency sound peaks, etc.) of the natural noise profile 1000 can be targeted and may be reduced to a noise level that is less than 85 dB, as shown by suppressed noise profile 1100, and in some instances, all of the sound peaks may be reduced to a noise level that is less than 80 dB. Accordingly, the sound suppression system 400 is configured to effectively reduce the low-frequency noise levels perceived by the passengers within the passenger capsule assembly 202 without requiring the passengers to wear ear plugs or electronic noise canceling devices in or around their ears.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X; Y; Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the vehicle 10, the seats 300, and the sound suppression system 400 as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

The invention claimed is:

1. A vehicle comprising:
a passenger capsule including a headliner;
a seat positioned within the passenger capsule, the seat including a headrest; and
a sound suppression system including:
one or more speakers at least one of (i) positioned within the headrest or (ii) positioned within the headliner;
a sensor positioned to detect a presence of passengers, acquire identifying characteristics of the passengers, and facilitate monitoring movement of the passengers; and
a controller configured to:

store a set of passenger profiles associated with a plurality of passengers of the vehicle, each of the plurality of passenger profiles including pre-stored identifying characteristics of a passenger associated therewith;

receive an indication from the sensor that a respective passenger of the plurality of passengers is sitting in the seat;

identify a respective passenger profile associated with the respective passenger from the set of passenger profiles based on respective identifying characteristics acquired by the sensor from the respective passenger corresponding with the pre-stored identifying characteristics of the respective passenger profile;

control the one or more speakers based at least in part on the respective passenger profile to emit noise-canceling sound waves having at least one of a target frequency or a target amplitude to generate a noise suppression zone that projects outward from at least one of the headrest or the headliner toward the respective passenger sitting in the seat to suppress one or more low frequency sound waves perceived by the respective passenger; and dynamically adjust the noise suppression zone based on the movement of the respective passenger.

2. The vehicle of claim 1, wherein the noise suppression zone is configured to suppress one or more sounds waves having a frequency less than 2,000 Hz.

3. The vehicle of claim 2, wherein the frequency is less than 1,000 Hz.

4. The vehicle of claim 1, wherein the noise suppression zone is configured to project from the at least one of the headrest or the headliner up to at least 8 inches.

5. The vehicle of claim 4, wherein the noise suppression zone is configured to project from the at least one of the headrest or the headliner up to at least 16 inches.

6. The vehicle of claim 1, wherein the one or more speakers are positioned within the headrest, and wherein the one or more speakers includes a first speaker positioned along a centerline of the headrest, a second speaker laterally offset from the centerline to a first side of the first speaker, and a third speaker laterally offset from the centerline to an opposing second side of the first speaker.

7. The vehicle of claim 6, wherein the first speaker is configured to emit the noise-canceling sound waves at a lower frequency than the second speaker and the third speaker.

8. The vehicle of claim 1, wherein the one or more speakers are positioned within the headliner, and wherein the one or more speakers includes a first speaker positioned in the headliner directly above the seat, a second speaker positioned in the headliner and laterally offset from the first speaker to a first side of the first speaker, and a third speaker positioned in the headliner and laterally offset from the first speaker to an opposing second side of the first speaker.

9. The vehicle of claim 8, wherein the first speaker is configured to emit the noise-canceling sound waves at a lower frequency than the second speaker and the third speaker.

10. The vehicle of claim 1, further comprising a microphone configured to be positioned proximate the head of the respective passenger within the seat, the microphone configured to provide sound feedback to the controller, wherein the controller is configured to perform error tracking and dynamically adjust the noise suppression zone based on the sound feedback.

11. The vehicle of claim 10, wherein the microphone is positioned within the headrest of the seat.

12. The vehicle of claim 10, wherein the microphone is a wearable microphone.

13. The vehicle of claim 1, wherein the seat is a first seat and the one or more speakers are one or more first speakers associated with the first seat, further comprising a second seat, wherein the sound suppression system includes one or more second speakers associated with the second seat, wherein the controller is configured to control the one or more first speakers and the one or more second speakers.

14. The vehicle of claim 1, wherein the seat is a first seat, the one or more speakers are one or more first speakers associated with the first seat, and the controller is a first controller configured to control the one or more first speakers, further comprising a second seat, wherein the sound suppression system includes one or more second speakers associated with the second seat and a second controller configured to control the one or more second speakers independent of the first controller and the one or more first speakers.

15. The vehicle of claim 1, wherein the controller is configured to:

store a baseline noise profile for the vehicle;

control the one or more speakers to emit the noise-canceling sound waves having at least one of the target frequency or the target amplitude based on the baseline noise profile; and adjust the target frequency or the target amplitude based on feedback received from a microphone.

16. A sound suppression system for a vehicle, the sound suppression system comprising:

one or more speakers configured to be positioned within a cabin of the vehicle;

a microphone configured to be positioned within the cabin and acquire sound data regarding one or more sounds waves perceived by a passenger of the vehicle;

a sensor positioned to acquire identifying characteristics of the passenger and facilitate monitoring movement of the passenger; and a controller configured to:

store a passenger profile associated with the passenger of the vehicle, the passenger profile including pre-stored identifying characteristics of the passenger;

receive an indication that the passenger is sitting in the cabin;

determine that the passenger profile is associated with the passenger based on the identifying characteristics acquired by the sensor from the passenger corresponding with the pre-stored identifying characteristics of the passenger profile;

receive the sound data from the microphone;

control the one or more speakers based at least in part on the sound data and the passenger profile to emit noise-canceling sound waves having at least one of a target frequency or a target amplitude to generate a noise suppression zone that projects toward the passenger of the vehicle to suppress at least one of the one or more sound waves perceived by the passenger; and dynamically adjust the noise suppression zone based on the movement of the passenger.

17. The sound suppression system of claim 16, wherein the one or more speakers are configured to be at least one of (i) positioned within a headrest of a seat within the vehicle or (ii) positioned within a headliner of the cabin.

18. The sound suppression system of claim 16, wherein the microphone is configured to be positioned within a headrest of a seat within the cabin.

19. A vehicle comprising:
- a passenger cabin including a headliner and a seat; and
- a sound suppression system including:
  - one or more speakers positioned within the headliner of the passenger cabin above the seat;
  - a microphone positioned within the passenger cabin and configured to acquire sound data regarding one or more sounds waves perceived by a passenger of the vehicle;
  - a sensor positioned to detect a presence of the passenger, acquire passenger data including identifying characteristics of the passenger, and facilitate monitoring movement of the passenger; and
  - a controller configured to:
    - store a set of passenger profiles associated with a plurality of passengers of the vehicle, each of the plurality of passenger profiles including pre-stored identifying characteristics;
    - receive the sound data from the microphone;
    - receive the passenger data from the sensor;
    - identify a respective passenger profile associated with the passenger from the set of passenger profiles based on the identifying characteristics acquired by the sensor from the passenger corresponding with the pre-stored identifying characteristics of the respective passenger profile;
    - control the one or more speakers based at least in part on the sound data and the respective passenger profile to emit noise-canceling sound waves to generate a noise suppression zone that projects toward the passenger of the vehicle to suppress at least one of the one or more sound waves perceived by the passenger; and
    - dynamically adjust the noise suppression zone based on the movement of the passenger.

* * * * *